Feb. 25, 1936.   I. JEPPSSON   2,031,656
ELECTRIC TOASTER
Filed Jan. 6, 1933   5 Sheets-Sheet 1
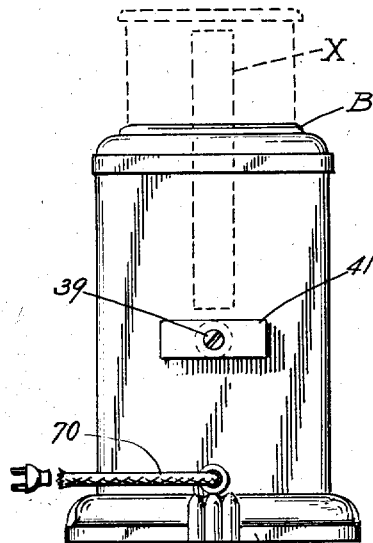
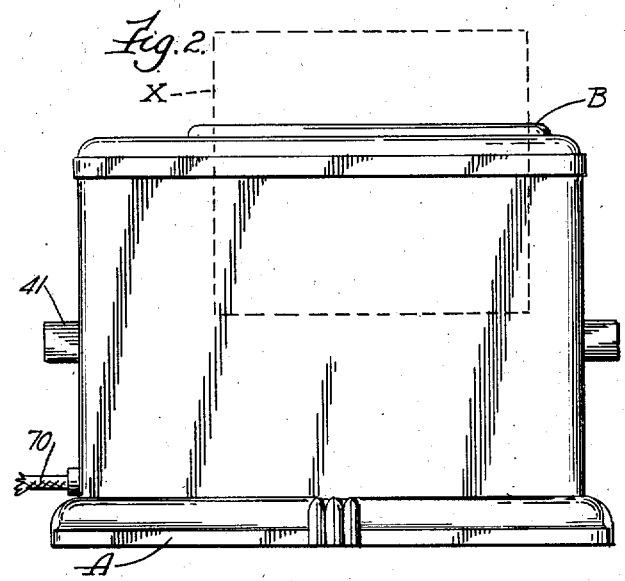
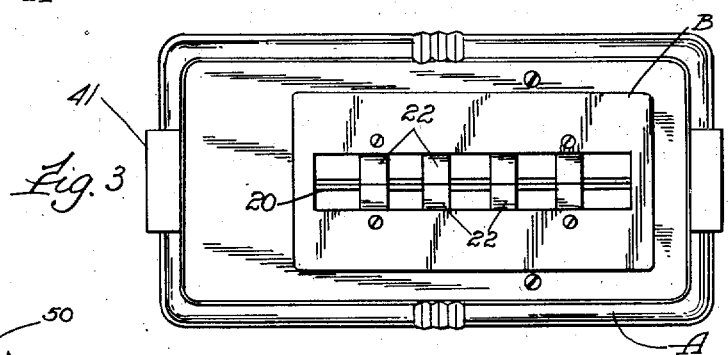
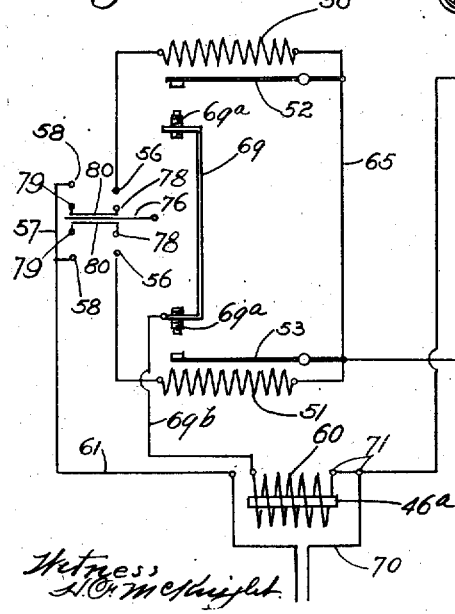

Feb. 25, 1936.   I. JEPPSSON   2,031,656
ELECTRIC TOASTER
Filed Jan. 6, 1933   5 Sheets-Sheet 2
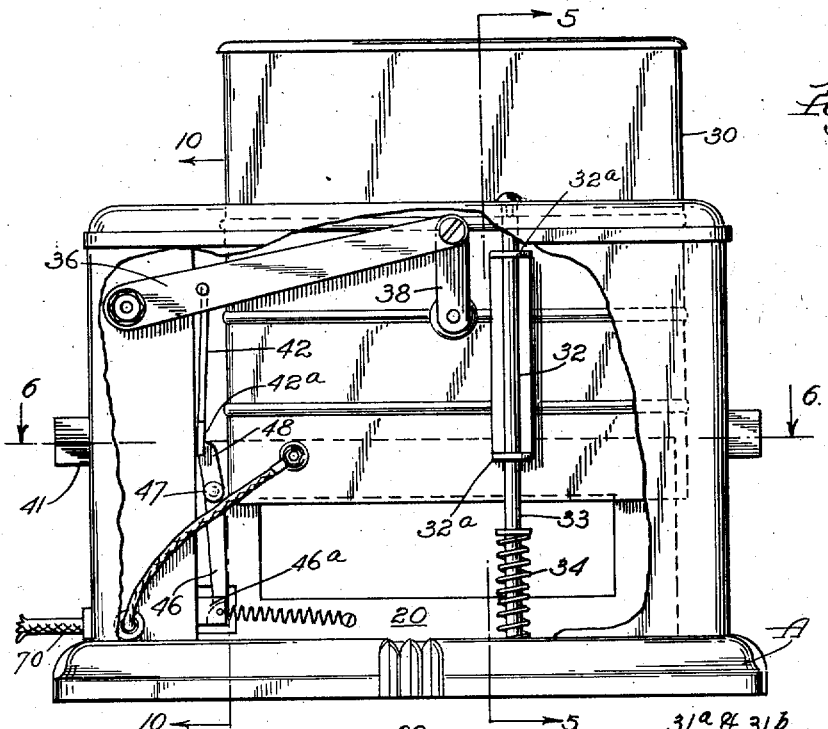
Fig. 4
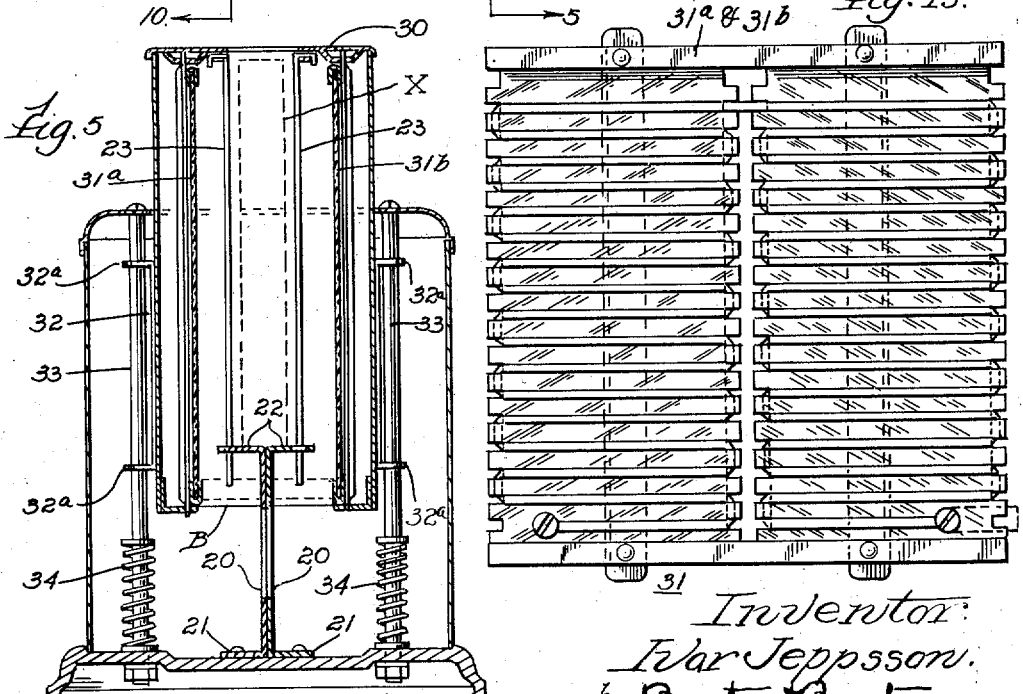
Fig. 5
Fig. 15
Witness
H. C. McKnight
Inventor:
Ivar Jeppsson.
by Burton & Burton
his Attorneys.

Feb. 25, 1936.     I. JEPPSSON     2,031,656
ELECTRIC TOASTER
Filed Jan. 6, 1933     5 Sheets-Sheet 3
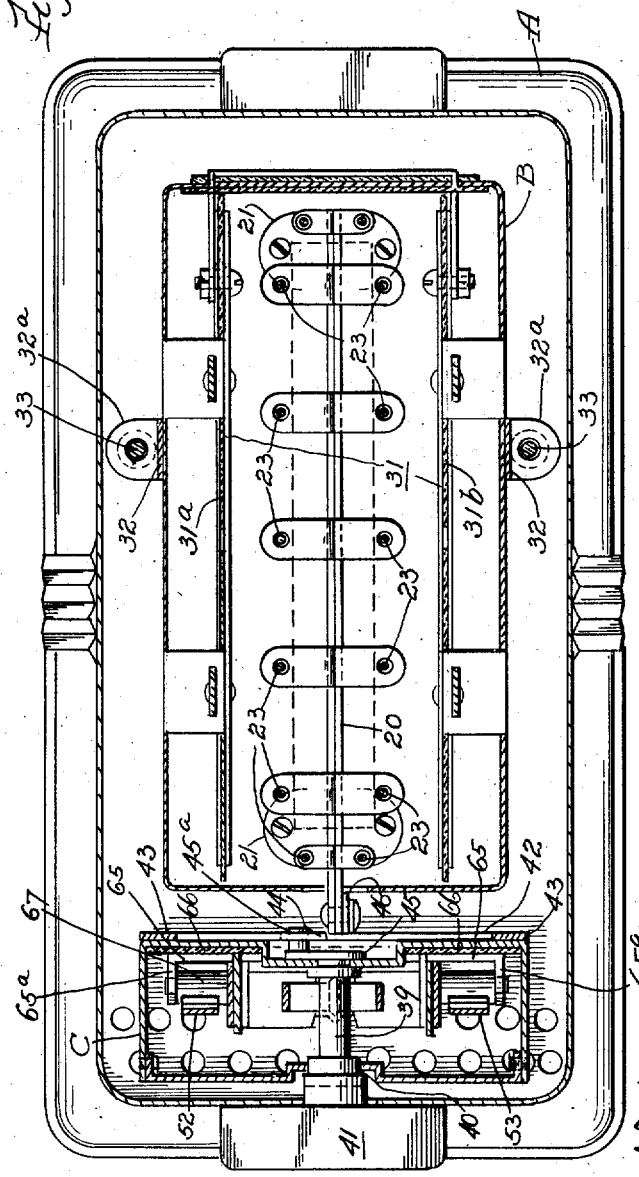
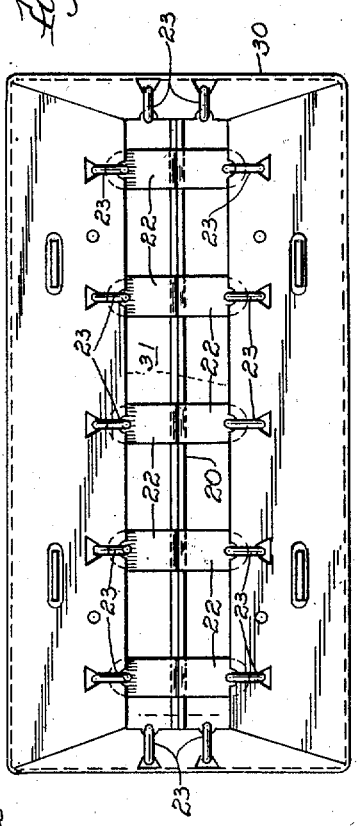
Inventor:
Ivar Jeppsson.
by Burton and Burton
his Attorneys.

Feb. 25, 1936.                I. JEPPSSON                2,031,656
                          ELECTRIC TOASTER
                         Filed Jan. 6, 1933              5 Sheets-Sheet 4
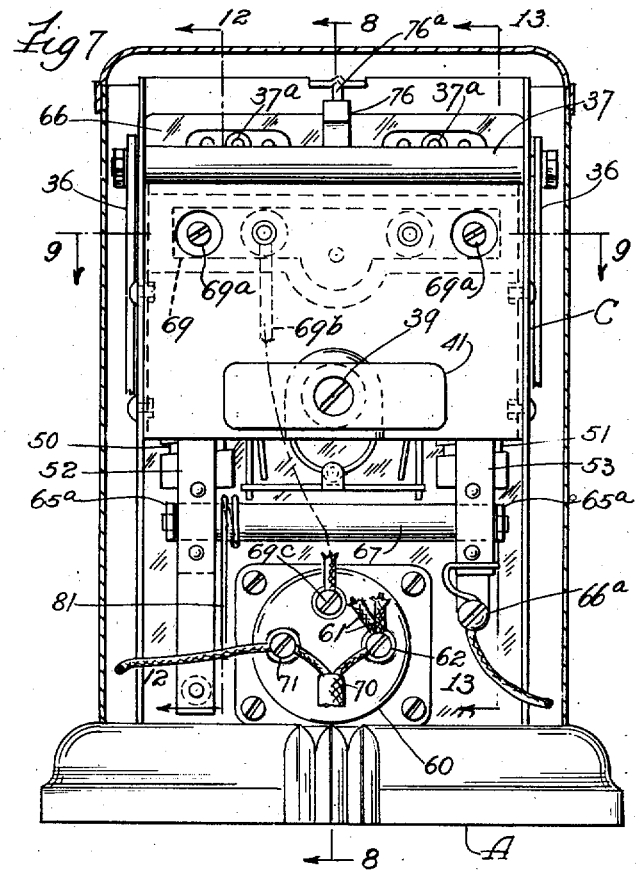
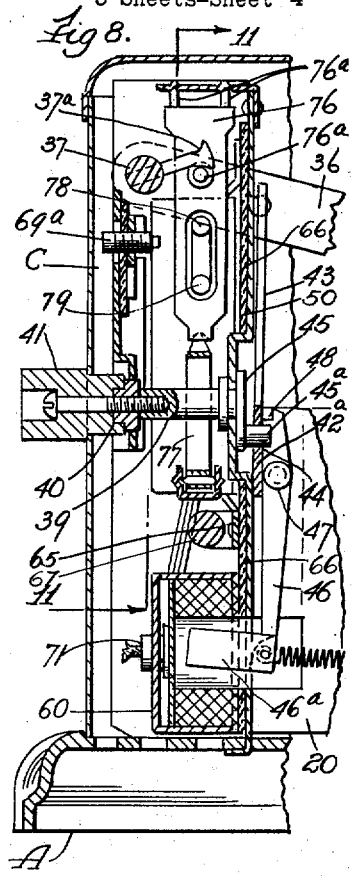
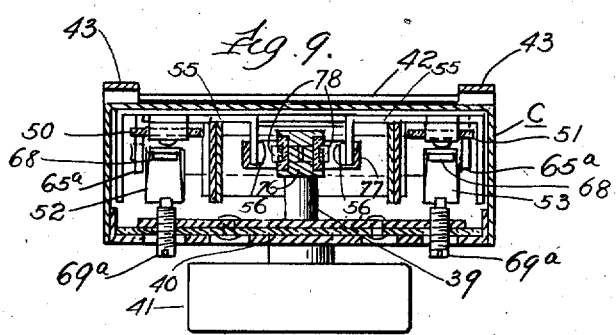

Feb. 25, 1936. I. JEPPSSON 2,031,656
ELECTRIC TOASTER
Filed Jan. 6, 1933 5 Sheets-Sheet 5
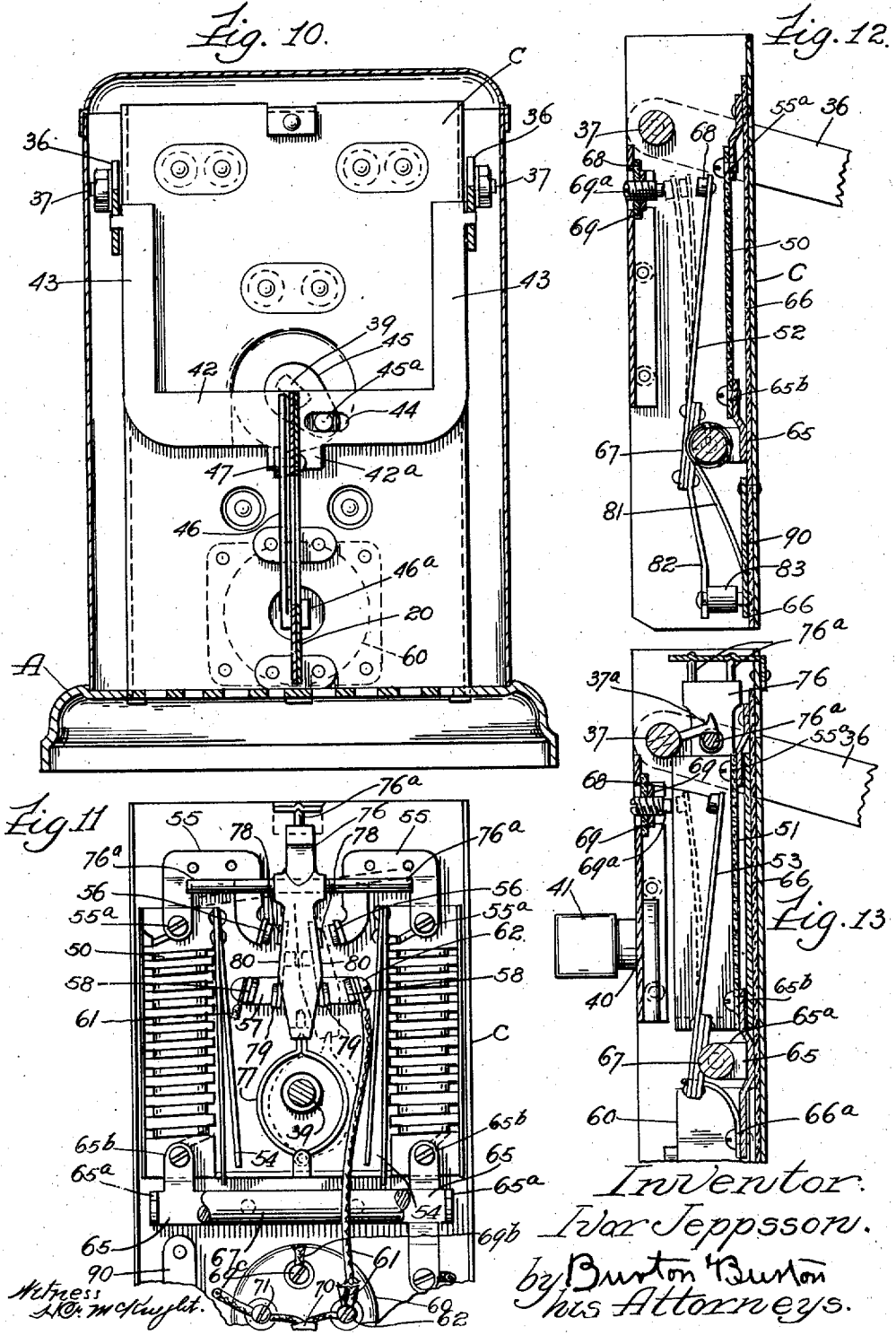

Patented Feb. 25, 1936

2,031,656

UNITED STATES PATENT OFFICE 2,031,656

ELECTRIC TOASTER

Ivar Jeppsson, Chicago, Ill., assignor to Chicago Flexible Shaft Company, Chicago, Ill., a corporation of Illinois Application January 6, 1933, Serial No. 650,425

19 Claims. (Cl. 219—19)

The purpose of this invention is to provide an improved form and construction of an apparatus for heat treatment of substance subjected to the operation of the structure, as for example, toasting bread slices, the detail construction illustrated being that of a bread toaster. The invention consists in the elements and features of construction shown and described as indicated in the claims.

In the drawings:

Figure 1 is an end elevation of the toasting apparatus embodying this invention showing the heating element in toasting position.

Figure 2 is a side elevation of the same with the heating element out of toasting position and showing a slice of bread inserted in the slice holder in position for exposure to the heating element when the latter is adjusted to toasting position, as seen in Figure 1.

Figure 3 is a top plan view with the slice removed from the heating element for disclosing the slice supporting means of the slice holder.

Figure 4 is a side elevation with the casing partly broken away for disclosing the operating means for adjusting the heating element to toasting and non-toasting positions.

Figure 5 is a section at the line 5—5 on Figure 4.

Figure 6 is a section at the line 6—6 on Figure 4.

Figure 7 is a vertical section through the timer casing showing the timer mechanism in elevation.

Figure 8 is a section at the line 8—8 on Figure 7.

Figure 9 is a section at the line 9—9 on Figure 7.

Figure 10 is a section at the line 10—10 on Figure 4.

Figure 11 is a section at the line 11—11 on Figure 8.

Figure 12 is a section at the line 12—12 on Figure 7.

Figure 13 is a section at the line 13—13 on Figure 7.

Figure 14 is a top plan view of the slice holder seen in relation to the encompassing carrier of the heating element of the toaster.

Figure 15 is an elevation of either of the two parts of the electrically energized heating element of the toaster.

Figure 16 is a wiring diagram of the entire apparatus.

Referring to the drawings in detail: The structure comprises a base plate, A, on which there are mounted two casing members, B and C, housing separate mechanisms which cooperate by means of elements extending from the respective casings for coming into cooperative relation. The casing, B, contains the heat treatment or toasting means including a holder for the substance to be heat treated, referred to specifically as a slice holder, mounted in the casing for supporting the slice in fixed position, and a heating element electrically energized, and a carrier for said heating element mounted adjustably in the casing for movement from a normal position out of heating—toasting—relation to a slice on the slice holder to a position for toasting.

The casing, C, contains means for timing the duration of the heat treatment period, and with its contents is hereinafter referred to in entirety as the timer.

Returning to the toaster or heat treatment member of the construction: Mounted on the base plate, A, there may be seen an upright bracket, 20, made of two sheet metal stampings spot-welded or otherwise permanently secured together, and which might be made in one piece, having foot flanges, 21, for mounting the bracket permanently on the base plate, and top flanges, 22, which constitute lodgment for a slice to be treated, indicated at X. The remainder of the slice holder consists of a plurality of slender rods or wires, 23, in two groups at opposite sides of the slice position, these rods being suspended from the upper end of the heating element carrier, 30, hereinafter particularly described, and being positioned at their lower ends by extending through small holes in the flanges, 22, of the bracket, 20.

The heating element consists of an electrically energized heating coil of high resistance wire and usual construction of such devices, said coil being arranged in two parts, $31^a$ and $31^b$, connected with each other for carrying the energizing current in series, said two parts being supported in the heating element carrier, 30, which constitutes a hood dimensioned for telescopingly enclosing the slice holder, said carrier being mounted in the casing, B, for sliding up-and-down in said casing and about the slice holder, the normal position of the heating element being with the carrier at the lowermost position of its range of up-and-down movement, at which position a slice lodged edgewise on the slice support of the slice holder protrudes from the upper end of the heating element casing a large fraction of the width of the slice, so that it is out of toasting position, or to speak more exactly, the heating element is out of toasting position with relation to the slice. For holding and guiding the heating element in the position and for the adjustment described, the hood or casing member is provided exteriorly at each side with a vertically extended bracket, 32, with projecting apertured lugs, 32ª, and there are mounted in the base plate, A, guide rods, 33, which are engaged in the apertures of the lugs, 32ª. It will be understood that the heating element is thus adapted to settle by gravity to the lowest position in the range of sliding of the lugs, 32ª, on the guide rods; and to cushion its descent from elevated to normal low position, there are shown light coil springs, 34, on the guide rods whose upper ends the lugs encounter in the descent of the heating element from toasting position to normal non-toasting position.

For adjusting the heating element to toasting position there is shown a lever member comprising a rock shaft, 37, mounted in the timer housing, which, as mentioned, is mounted fixedly on the base plate, A, said lever comprising two parallel arms, 36, 36, extended from opposite ends of the rock shaft, 37, and embracing the heating element carrier, 30, and connected to the opposite walls of said carrier by links, 38, 38. For operating this lever member to elevate the heating element to toasting position, there is journalled in the timer casing a rock shaft, 39, with its end protruding at the outer side of the timer, as seen at 40, and formed for engaging with an operating knob indicated at 41; at the inner side of the timer there is shown a U-shaped link, 42, having its parallel arms, 43, 43, extending up for connection respectively with the lever arms, 36, 36; and a lug, 42ª, of the cross bar of this U-shaped link has a cam slot, 44, which is engaged by the crank wrist, 45ª, of a crank arm, 45, on the inner end of the operating rock shaft, 39.

For latching the heating element in elevated toasting position there is shown a latch, 46, pivoted at 47 on a bracket, 47ª, mounted on the inner side wall of the timer casing and having its upper end arranged to engage the under side edge of the lug, 42ª, of the cross bar of the U-shaped link, 42, as seen at 48, in Figure 4.

The latch, 46, is extended down from its pivot, and at its lower end part constitutes an armature for an electromagnet device which constitutes a feature of the timer as hereinafter described, operating by the attraction of the armature by the magnet for disengaging the latch from the U-shaped link, 42, to release the heating element of the toaster, permitting it to drop out of toasting position.

Referring to the timer mechanism: It comprises as a characteristic feature a pair of electrically energized heating elements, 50 and 51, mounted insulatedly on the timer casing, and each connected for energization in the electric circuit in which the heating element of the toaster is energized, as may be understood from the wiring diagram Figure 16. Suitably proximate to the heating elements, 50 and 51, respectively, are mounted temperature-responsive devices, 52 and 53, of familiar construction, each being a flat bi-metallic bar adapted by the different thermal coefficients of expansion of the two metals of which it is composed, to be flexed by change of temperature, and each constituting a switch member in an electric circuit hereinafter described in which the electromagnet device above mentioned, which, as shown, is of solenoid type, as seen at 60, is energized. The lever, 46, having its lower end furnished with an offset lug, 46ª, which intrudes into the solenoid, becomes thus the armature of the electromagnet, as above mentioned.

The circuit which includes the winding of the electromagnet, 60, includes a conductive bracket member, 65, insulatedly mounted in the timer casing, as seen at 66, and connected with the circuit in which the heated element of the toaster is energized, as indicated by the binding screw, 66ª.

In the end lugs, 65ª, of the bracket, 65, there is mounted a rocker, 67, carrying conductively secured thereto both the temperature-responsive devices, 52 and 53, each of which in turn is thus brought into and becomes a switch member in the circuit which is closed by the flexure of the temperature-responsive device carrying a contact, 68, at its free end into circuit-closing encounter with a contact terminal of the post, 69ª, which projects from an insulatedly mounted conductive plate, 69, connected by wire, 69ᵇ, with the solenoid winding as indicated at 69ᶜ.

The purpose of the two temperature-responsive devices and their heating elements, respectively, is to time the duration of the heat treatment or toasting period of the successively introduced slices, suitably to effect substantially equal toasting, which it has been found cannot be reliably done if the duration of the toasting period is governed entirely by the temperature of the heating element of the toaster; because when the successive slices are introduced one after another with the shortest intervals which suffice for manually removing one slice and introducing another, the cooling of the heating element in the short intervals is so slight that after the second or third slice, the heating element is so nearly at the maximum temperature of which it is susceptible under current of a given voltage, that that maximum temperature is reached and the toasting terminated almost instantly upon introducing the next slice and setting the heating element in toasting position.

To avoid such unsatisfactory operation, the timer in the present construction is furnished, as described, with two heating elements which are not to any substantial degree exposed to the heat of the heating element, 31, of the toaster, but on the contrary being heated alternately in the successive toasting operations, and exposed to air circulation through the timer casing for cooling not only in the intervals between consecutive toasting operations, but also each during the energization of the other, so that however rapidly and at however short intervals the slices are introduced and the toaster re-adjusted for toasting, the timer heating coils are not liable to become heated to any such near approach to maximum temperature as to materially shorten the toasting period.

In order to operate in this manner, that is, so that the heating elements of the timer are energized alternately in the successive toasting operations, only one being energized at each toasting operation, the other being de-energized and exposed for cooling, the circuit in which they are to be thus alternately energized comprises switching means which will be described in connection with the description of the circuit connections. The inleading wire of the toaster-energizing-circuit is connected, as indicated at 70, with one end of the solenoid winding, as indicated by the binding screw, 71.

The heating elements, 50 and 51, are each connected at one end in circuit with the heating element, 31, of the toaster by means of the insulatedly mounted conductive bracket member, 65, the lower end of each of the heating coils, 50, 51, being attached by binding screw to said bracket, 65, as at 65b, the other end of each heating coil being connected, as indicated at 55a, for continuing the circuit with an insulated conductive bracket member, 55, which carries a contact, 56.

An insulatedly mounted bracket member, 57, carries contacts, 58, 58, spaced a short distance respectively from the contacts, 56, of the brackets, 55; and from the bracket, 57, as in the wiring diagram, Figure 16, or from each of the contacts, 58, as shown in Figure 11, a circuit wire, 61, leads to a binding screw, 62, for connecting the circuit to the winding of the solenoid, 60.

A switch-operating lever member, 76, pendant from its upper end pivot on the timer casing, as seen at 76a, and pivotally engaged at its lower end with a pivotal spring-stressed member, 77, cooperating with said lever member, 76, for snap action, as more particularly hereinafter described, carries conductively connected contacts, 78 and 79, spaced apart on their conductive mounting, 80, which is mounted correspondingly on the member, 76, correspondingly to the spacing apart of the contacts, 56 and 58, at each side of the normal pendant position of the member, 76, so that when it is swung to either side from said normal position, the contacts, 78 and 79, register respectively with the contacts, 56 and 58, at that side for bridging the circuit gap between said last mentioned contacts and closing the circuit through the heating element situated at that side.

The pendant member, 76, has a rigid cross rod, 76a, which is horizontal at the normal directly pendant position of said member, 76; and the rock shaft, 37, which is positioned proximate to the pendant lever member has two short lever arms, 37a, 37a, which at the position of said rock shaft occupied when the heating element of the toaster is in toasting position, and at the position of the pendant lever arm occupied during the toasting period, project over the oppositely extended end portions of the cross rod, 76a, which at said position of the pendant lever member extends inclined transversely as seen in dotted line in Figure 11; and upon the release of the heating element of the toaster and its descent from toasting position, accompanied by the rocking of the shaft, 37, in the direction for swinging the short lever arms, 37a, downward, the arm, 37a overhanging the uplifted end of the cross rod, 76a, encountering the latter, rocks the pendant lever member, 76, toward directly vertical position, swinging the opposite end of the rod, 76a, up into encounter with the other short lever arm, 37a, which last mentioned encounter occurs when the pendant member, 76, and its snap action partner, 77, are in position of alignment of their three pivots ready to snap over the dead center with respect to the upper end pivot of the pendant member, 76. This position of the parts, with the pivotal engagement of the cooperating members, 76 and 77, just snapped past the dead center, and the cross rod at horizontal position, stopped as to both the opposite arms against the encountering and encountered short lever arms, 37a, of the rock shaft, 37, is the position occupied at the finish of each toasting position.

And it will be understood that at this position the circuit-bridging contact mount, 80, is out of circuit-closing position, bridging neither the gap in the circuit of the heating element, 50, nor in that of the circuit of the element, 51.

When the operator having inserted a fresh slice in the slice-holder, and operated the rock shaft, 39, by the knob, 41, for uplifting the heating element of the toaster into toasting position, the resulting rocking of the shaft, 37, swinging up the lever arms, 37a, releasing the cross rod, 76a, permits the completion of the snap action of the cooperating members, 76 and 77, consisting in swinging the pendant member, 76, to the opposite limit of its range of pivotal movement from that at which it stood during the toasting period which was terminated by the action described—due to the rocking of the shaft, 37, in the descending movement of the heating element of the toaster to non-toasting position—and causes the circuit in which the other heating element, 51, is energized, to be closed by the contact-carrying part, 80, bridging the gap in the circuit of that element, as in the last preceding toasting period it bridged the gap in the circuit of the element, 50.

The cycle of operation as above described, beginning with the release and withdrawal from toasting position of the heating element of the toaster, is due to the energization of the electromagnet, 60, which is effected by the action of the temperature-responsive device, 52, flexed in response to the temperature of the heating element, 51, raised by its energization by the electric current in the circuit in which the heating element of the toaster is energized, said responsive action consisting in the flexure of the part, 52, carrying the contact, 52a, at its free end into circuit-closing encounter with the contact carried by the post, 69a, mounted, as described, on the insulated plate, 69, which is connected by wire, 69b, to the winding of the electromagnet, 60, said encounter completing the circuit for energizing the electromagnet, causing the armature, 46a, to be attracted and operate the latch, 46, whose terminal lug, 46a, constitutes said armature, in the direction for releasing the link, 42, and permitting the heating element of the toaster to drop out of toasting relation to the slice in the slice-holder.

The completion of the snap action by the pivot between the cooperating lever elements, 76 and 77, passing the dead center in the right direction, according to which heating element and temperature-responsive device has been operating in the toasting period being terminated, is rendered certain by the provision at each side of the pendant member, 76, of an auxiliary thermostat, 54, exposed to the heat of the heating element, 50, or 51, at that side, and being flexed against the member, 76, tending to stress it in the direction for carrying the pivotal junction of the parts, 76 and 77, in the right direction past the dead center.

Upon consideration of the construction as thus far described, it may be recognized that the circuit in which the different elements are energized and operated comprises in the outleading line from the heating element of the toaster a loop-branch-in-parallel, as indicated in the wiring diagram of Figure 16, from the intersection of the line 70 with the line 65, by way of the temperature-responsive switch member, 53, contact 69a, on the insulated conductor plate, 69, by which the electro-magnet, 60, is energized, and thence by wire, 69b, to the winding of electro-magnet, as seen and indicated in Figure 11, the loop-in-parallel being completed by the wire from the other end of the electro-magnet winding to the main line, as indicated at 71 in the diagrammatic Figure 16, and as shown in Figure 11. And it will be seen that the temperature-responsive switch element, 53, in this loop-in-parallel is located adjacent the heating coil, 51, included in the main line, and which serves for influencing the temperature-responsive switch member to close the circuit at the contact, 69ª, with the result above described, of terminating the toasting period and opening the circuit which was closed by the temperature-responsive switch element, 53, responding to the rise in temperature of the heat coil, 51, the opening of the circuit being effected, as described, by the action of the lever arms, 37ª, of the rocker shaft, 37, encountering the cross stem, 76ª, of the switch member, 76, and setting the latter at circuit-open position seen in Figure 11.

Upon further consideration it will be recognized that the loop-branch-in-parallel contains a duplicate, 52, of the temperature-responsive switch element, 53, which duplicate is located adjacent to a duplicate, 50, of the electrically-energized heating element, 51, contained in the main line, and that the circuit was not closed through the heating element, 50, during the toasting period in which the circuit was closed by the switch element, 76, bridging the gap of the circuit in which the heating coil, 51, was energized, as above described. And when the operator putting in place a fresh slice to be toasted operates the mechanism for setting the toaster heater in toasting position, this operation releasing the cross bar, 76ª, from the lever arms, 37ª, permitting the completion of the snap action of the switch member, 76, the circuit is closed through the heating coil, 50, whose resulting temperature will determine the duration of the toasting period, while the coil, 51, is cooling. And thus by the provision duplicating the heating coils in the main circuit, and the temperature-responsive switch members in the loop-branch-in-parallel, alternation of service of the two coils, which prevents overheating which would result from continuous service of one coil, is accomplished.

Upon considering the operation of the thermostatic elements, 52 and 53, for closing the circuit to energize the electromagnet to terminate successive toasting periods, it will be understood that they must be held fixed at their lower ends in order to have the necessary circuit-closing movement at their upper ends due to flexure resulting from heating by the adjacent heating elements, 51 and 52, respectively; and these thermostatic elements being mounted, as described, on the rocker, 67, a stop must be provided for the rocking movement of the rocker in order that the thermostats shall be thus fixed at their lower ends when operating, as described, for flexure by heat response to close the circuit. Except for a reason hereinafter explained, the rocker, 67, would not be employed, and the thermostats would be mounted permanently rigid with the conductive bracket, 65, but, as shown, for the reason referred to, the lower ends of the thermostats are rendered fixed for ensuring the proper movement of their upper ends by means rendering the rocker suitably fixed, this means consisting in providing a spring, 81, coiled about the rocker with one end secured thereto, and having its other end stopped on the timer casing, and furnishing the rocker with a short lever arm, 82, extending downwardly, which may be an extension of one of the thermostats—as shown in the thermostat, 52—and providing a stop, 83, for that lever arm against which the latter is held by the reaction of the spring, 81, on the rocker, thus positioning the thermostats, 52 and 53, with their upper contact-carrying ends at normal position—when cold—at a distance from the circuit-closing position which may be determined by adjusting the stop, 82.

The reason for this construction instead of simply mounting the thermostats fixedly at their lower ends, as by making them permanently rigid with the bracket, 65, will now be explained.

In the use of toasting apparatus provided with a timer having the two heating elements and cooperating thermostats arranged to serve alternately in successive toasting operations for timing the duration of the toasting periods, it has been found difficult to properly relate the size or extent of the heating elements for heat-generating capacity to the heat-responsive capacity of the thermostatic elements, and the heat-retaining and radiating capacity of the timer as a whole, including the casing, so that the time required to heat the temperature-responsive element of the timer to cause its flexure to close the circuit and terminate the toasting period, shall be substantially uniform after the timer as a whole has a certain moderate temperature which it will acquire in the first toasting operation, and will not lose in a normal interval between successive slices on the same occasion of toast making. This involves relating the parts as to size and distance between the two heating elements, and the distance between them and the respective cooperating thermostats, so that the parts heated in each toasting period shall become cooled in the succeeding toasting period, plus the interval between periods, to the certain moderate temperature referred to.

A very large amount of experimentation is necessary to approximate the proper relation of sizes and distances of the several parts as indicated; and to avoid carrying such experimentation to the limit, I have made provision for adjusting the thermostats, 52 and 53, as to normally open-circuit position, to vary the amount of movement due to flexure by temperature change necessary to close the circuit so that more movement, requiring more temperature change, is necessary in any instance in which the timer is not cooled to the moderate temperature referred to in the cooling interval indicated. This is effected by providing an auxiliary thermostat, 99, mounted to respond to the temperature of the timer as an entirety, and connected at its free end which is moved by its deflection, with the stop, 83, for withdrawing said stop from the lever arm, 82, more or less as the thermostat is flexed more or less by heating.

I claim:

1. In a toasting apparatus, a frame structure; a slice-holder mounted in the frame structure for holding the slice in fixed position; an electrically energized heating element; a carrier for said heating element mounted movably in the frame structure for carrying said heating element into and out of toasting relation to a slice in the slice-holder and normally positioned for holding the heating element out of toasting position relatively to a slice in the holder; a circuit in which the heating element is energized; manually operable means for moving the heating element into toasting position; means for displacing said element from toasting position arranged to be put into operation for said displacement by movement of a temperature-responsive device; a temperature-responsive device operatively associated with said displacing means for causing such displacement; a second heating element to which said temperature-responsive device is exposed for response to the temperature thereof, said second heating element being independent of the heating element of the toasting means and being connected for being energized in the circuit in which the heating element of the toasting means is energized, said last mentioned temperature-responsive device being guarded from exposure to the heat of the toaster-heating means.

2. The construction defined in claim 1 having an additional temperature-responsive device associated with the displacing means for causing said displacement, and an additional electrically energized heating element associated with said additional device; switch mechanism arranged for connecting said two heating elements alternately in said circuit comprising a switch member connected for being shifted from position for closing the circuit through either of said heating elements to position for closing the circuit through the other by the movement of the movable element of the toaster out of toasting position; whereby each of said temperature-responsive devices acts under the control of the heating element to which it responds for controlling the duration of alternate toasting periods of the apparatus.

3. In a toasting apparatus having a slice-holder and an electrically energized toasting heating element relatively movable for cooperation in establishing and terminating toasting proximity of the toasting heating element to a slice carried in the holder; an electric circuit in which said toasting heating element is energized; manually operable means for adjusting the movable one of said cooperating parts to toasting position; automatically operating means for causing the displacement of said movable element from toasting position comprising a temperature-responsive device thermally isolated from the toasting-heating element constructed for movement by temperature change; an electrically energized non-toasting heating element distinct from the toasting element and to whose temperature the temperature-responsive element is arranged to respond by movement, said distinct non-toasting heating element being connected for energization in the circuit in which the toasting element is energized.

4. In a toasting apparatus having a slice-holder and an electrically energized heating element relatively movable for cooperation in establishing and terminating toasting proximity of the heating element to a slice carried in the holder; an electric circuit in which said heating element is energized; manually operable means for adjusting the movable one of said cooperating parts to toasting position; automatically operating means for causing the displacement of said movable element from toasting position comprising a temperature-responsive device constructed for movement by temperature change; an electrically energized heating element to whose temperature the temperature-responsive element is arranged to respond by movement, said last mentioned heating element being connected for energization in the circuit in which the first mentioned heating element is energized, the second mentioned heating element and the temperature-responsive device responsive thereto being segregated from the first mentioned heating element and the slice-holder, so as to be substantially unaffected by the temperature of said parts of the toasting apparatus.

5. The construction defined in claim 3, the movable one of said cooperating parts of the toasting apparatus being arranged normally to occupy and return to non-toasting position; an automatically operating catch for latching said movable part in toasting position, the displacing means comprising an electro-magnet device having its armature connected for operating the catch to release said movable part, and a switch controlling the energization of the electromagnet operatively associated with the temperature-responsive device for closing by the movement of said temperature responsive element in response to predetermined temperature of said heating element.

6. The construction defined in claim 3, the movable one of said cooperating parts of the toasting apparatus being arranged normally to occupy and return to non-toasting position; an automatically operating catch for latching said movable part in toasting position, the displacing means comprising an electro-magnet device having its armature connected for operating the catch to release said movable part, and a switch controlling the energization of the electromagnet operatively associated with the temperature-responsive device for closing by the movement of said temperature-responsive element in response to predetermined temperature of said heating element, and means operated by the displacing movement of said movable part for opening the switch controlling the electro-magnet-energizing-circuit.

7. The construction defined in claim 3 having comprised in the automatically operating displacing means an additional temperature-responsive device, and an additional electrically energized heating element therefor, the movable one of said cooperating parts of the toasting apparatus being arranged normally to occupy and return to non-toasting position; a spring catch for automatically latching it in toasting position, the displacing means comprising means for operating the spring catch to release said movable part, said means including either of the two temperature-responsive devices, and switching mechanism arranged for connecting the two heating elements of said two temperature-responsive devices alternately in the circuit in which they are energized, said switching mechanism comprising a switch member connected for being shifted from position for closing the circuit through either of said heating elements to position for closing the circuit through the other by movement of the movable one of said relatively movable parts of the toasting apparatus out of toasting position.

8. A heat treatment apparatus comprising in combination a part movable from normal position for terminating the heat treatment; a temperature responsive element and an electrically energizable heating element associated therewith for response to temperature change of the heating element, said associated elements being located substantially out of exposure to the heat of the heat treatment apparatus and an additional temperature-responsive device and an additional electrically energized heating element to whose temperature the additional temperature-responsive element is arranged to respond, said additional heating element being energized in the same circuit with the first mentioned heating element, switching mechanism arranged to control the deflection of the current in said circuit from one to the other of said heating elements, comprising a switch member arranged to occupy alternatively two positions, at one of which it closes the circuit through one of said heating elements, and at the other of which it closes the circuit through the other of said elements, and operating connections from the movable part of the heat treatment apparatus for operating said switch member to shift the circuit connection from one to the other of said heating elements in the movement of said movable part in the direction for terminating the duration of the heat treatment period, and means for adapting the switch member to be shifted in opposite directions by the alternate movements of said movable part both in the same direction, consisting in mounting the switch member pivotally and furnishing it with a spring for effecting a snap action in either direction from a dead center position with respect to its pivot, and with a transverse arm for encounter of an operating connection of the movable part, said operating connections being formed for encounter with said transverse arm at either side of the pivot of the switch member according to the position of the switch member as determined by the last preceding encounter; whereby the switch is shifted in opposite directions for closing the two circuits respectively in the alternate heat terminating movements of said movable part.

9. In an apparatus for heat treatment of substance subjected to said apparatus, said apparatus having a movable part arranged to occupy a certain position for facilitating the heat treatment and movable from said position for terminating the heat treatment period comprising two temperature-responsive devices and two electrically energized heating elements associated with said devices respectively for response of the respective devices to the temperature changes of said heating elements respectively; an electric circuit in which said heating elements are connected for energization; switching means arranged to control the deflection of the current alternately from one to the other of said heating elements to cause the two temperature-responsive devices to operate alternately in the successive heat-treatment-terminating movements of the movable part of the heat treatment apparatus, said switching means including a switch member mounted for vibrating between two circuit contacts; operating connections from each of said temperature-responsive devices for causing the movement of said movable part in the direction for terminating heat treatment, and operating connections between said movable part and said switch member for shifting the latter to open the circuit of the heating element of the temperature-responsive device whose temperature-responsive movement caused the last occurring heating-period-terminating movement of said movable part, and close the circuit of the heating element of the other temperature-responsive device.

10. In the construction defined in claim 9, the vibrating switch member being pivotally mounted and furnished with a snap-over spring device for adapting it to be shifted in either of the opposite directions from either position to the other by the identical actuating movement of the movable part.

11. In combination with an electrically energized heat treatment apparatus having a part which is movable for terminating the heat treatment periods, a timer for automatically governing the duration of the heat treatment periods comprising a casing in which the timing elements are segregated from the heat of the heat treatment apparatus, said timing elements comprising a main temperature-responsive device, and operating connections by which the movement of said main temperature-responsive device due to rise of temperature in the casing in which said timing elements are segregated operates to cause movement of said movable part of the heat treatment apparatus for termination of the heat treatment periods, said operating connections including an electric circuit comprising a contact-carrying switch member movable from open position to close a gap in the circuit and arranged to be controlled as to said operation of the switch member by the temperature-responsive movement of said main temperature-responsive device, the latter being mounted for adjustment bodily to vary the width of the circuit gap and thereby the amount of temperature-responsive movement required to close the circuit; an auxiliary temperature-responsive device mounted in the timer casing for responding to the temperature changes of the timer as an entirety and in position to constitute by the part thereof which is moved in response to temperature change, an automatically adjusted stop for determining the bodily adjustment of the temperature-responsive device, whereby rise of temperature of the timer causes the auxiliary device to adjust the main temperature-responsive device to position requiring less movement due to temperature change for closing the circuit.

12. In combination with an electrically energized heat treatment apparatus having a part which is movable for terminating the heat treatment periods, a timer for automatically governing the duration of the heat treatment periods comprising a casing in which the timing elements are segregated from the heat of the heat treatment apparatus, said timing elements comprising a main temperature-responsive device, and operating connections by which the movement of said main temperature-responsive device due to rise of temperature operates to cause movement of said movable part of the heat treatment apparatus for termination of the heat treatment periods, said operating connections including an electric circuit arranged to be controlled as to opening and closing of the circuit by the temperature-responsive movement of said main temperature-responsive device, the temperature-responsive device being pivotally mounted for adjustment bodily about its pivot to vary the range of movement of its free end for opening and closing the circuit; an auxiliary temperature-responsive device mounted in the timer casing for responding to the temperature changes of the timer as an entirety and in position to constitute by the part thereof which is moved in response to temperature change an automatically adjusted stop for the movement of the pivotally mounted temperature-responsive device about its pivotal mounting in circuit-opening direction, whereby rise of temperature of the timer affecting said auxiliary device causes adjustment of the pivoted temperature-responsive device to position requiring less movement due to temperature change to close the circuit.

13. In the construction defined in claim 12, the timer having an additional main temperature-responsive device and electrically energized heating element located in relation to said additional temperature-responsive device suitably to cause the latter to respond to temperature changes of said heating element, said additional temperature-responsive device being connected identically as the first main temperature-responsive device for causing termination of the heat treatment period of the heat treating apparatus; switching means for shifting the circuit connections from one to the other of the heating elements of the two main temperature-responsive devices, said switching means being connected for operation by the movement of a part of the heat treatment apparatus in terminating the heat treatment periods, whereby alternate heat treatments are terminated by the alternate functioning of said two temperature-responsive devices of the timer, the two temperature-responsive devices being rigidly connected together for adjustment to vary the circuit gap, whereby the auxiliary temperature-responsive device constitutes an adjustable stop for determining the circuit gap of both said main temperature-responsive devices.

14. In the construction defined in claim 12, the timer having an additional main temperature-responsive device and electrically energized heating element located in relation to said additional temperature-responsive device suitably to cause the latter to respond to temperature changes of said heating element, said additional temperature-responsive device being connected identically as the first main temperature-responsive device for causing termination of the heat treatment period of the heat treating apparatus; switching means for shifting the circuit connections from one to the other of the heating elements of the two main temperature-responsive devices, said switching means being connected for operation by the movement of a part of the heat treatment apparatus in terminating the heat treatment periods, whereby alternate heat treatments are terminated by the alternate functioning of said two temperature-responsive devices of the timer, the two temperature-responsive devices being rigidly associated for pivotal mounting for the bodily adjustment defined in claim 12, whereby the auxiliary temperature-responsive device constitutes an adjustable stop for the pivotal movement of both said main temperature-responsive devices.

15. An electrically heated toasting apparatus comprising two members, one for supporting the electrically energized toast heating element and the other for carrying the toast, one of said members being movable with respect to the other for relatively displacing the heating element and the toast to terminate the toasting operation; a circuit in which the heating element is energized; switch means controlling said circuit arranged to be operated for interrupting the circuit by the movement of said movable member for said displacement; means for causing said relative displacement movement consisting in releasable locking means normally locking the movable member in toasting position; electrically operable means for releasing it for said displacement movement, the circuit including a second electrically energized heating element separate from and out of exposure to the heat of the toast-heating element and a temperature-responsive device exposed to said second heating element for responding to change of temperature of the latter and operatively associated with said lock-releasing means for releasing the same upon predetermined temperature of said temperature-responsive element.

16. An electrically-heated toasting apparatus comprising two members, one for supporting the electrically-energized toast-heating element, and the other for carrying the toast, one of said members being movable with respect to the other for relatively displacing the toast-heating element and the toast carrier to terminate the toasting operation; means for causing said relative displacement movement consisting in releasable locking means normally locking the movable member in toasting position, the toaster-energizing circuit having a branch-in-parallel, electrically-operable means for releasing the movable member for said displacement movement, said releasing means including a temperature-responsive element constituting a normally open switch member in said branch-in-parallel; a second electrically-energized heating element in said toaster-energizing circuit separate from and out of exposure to the heat of the toast-heating element operatively associated with said temperature-responsive element for response by the latter to temperature change in said second heating element, and an electro-magnet element whose winding is included in the branch circuit having its armature operatively connected for releasing the locking means.

17. An electrically-heated toasting apparatus comprising two members, one for supporting the electrically-energized toast-heating element and the other for carrying the toast, one of said members being movable with respect to the other for relatively displacing the toast-heating element and the toast carrier to terminate the toasting operation; means for causing said relative displacement movement consisting in releasable locking means normally locking the movable member in toasting position, the toaster-energizing circuit having a branch-loop-in-parallel; electrically-operable means for releasing the movable member for displacement movement, said releasing means including a temperature-responsive element constituting a normally open switch member in the branch-loop-in-parallel, and a second electrically-energized heating element separate from and out of exposure to the heat of the toast-heating element operatively associated with said temperature-responsive switch member for causing the latter to close the circuit in response to predetermined temperature of said second heating element, the toaster-energizing circuit including a second switch device which is normally closed; an electromagnet whose winding is included in the branch circuit having its armature operatively connected for releasing the locking means, and connections operated by the displacement movement of said movable member extended for operating the second mentioned switch element for opening the circuit.

18. An electrically-heated toasting apparatus comprising two members, one for supporting the electrically-energized toast-heating element, and the other for carrying the toast, one of said members being movable with respect to the other for relatively displacing the heating element and the toast carrier to terminate the toasting operation; means for causing said relative displacement movement consisting in releasable locking means normally locking the movable member in toasting position, electrically-operable means for releasing it for said displacement movement, the circuit including a second electrically-energized heating element separate from and out of exposure to the heat of the toast-heating element, and a temperature-responsive device exposed to said heating element for responding to change of temperature of the latter, and operatively associated with said lock-releasing means for releasing the same upon predetermined temperature of said temperature-responsive element, the circuit comprising two branches, the temperature-responsive device and the cooperating electrically-energized second heating element being duplicated in said branches of the circuit, and means in the connection by which the releasing means is operated for alternating the interruption of the circuit between the two branches.

19. An electrically-energized heat-treatment apparatus comprising two members movable relatively to each other for instituting and terminating the heat-treatment period, a heating element carried by one of said members; an electric circuit in which it is energized, said circuit including a temperature-responsive switch element connected for controlling a circuit-in-parallel with the heat treatment circuit which is arranged when energized to operate means for terminating the heat-treatment period, said circuit-in-parallel with the heat-treatment circuit having two branches each including a heating element and a switch with a member movable for opening and closing the circuit; means for operating said switch member to open either branch when the other is closed, said means including connections operated by the heat-treatment-terminating movement of the movable member; whereby the two heating elements are energized alternately in successive heat-treatments.

IVAR JEPPSSON.